US010712300B2

(12) United States Patent
Nakano et al.

(10) Patent No.: US 10,712,300 B2
(45) Date of Patent: Jul. 14, 2020

(54) GAS SENSOR DEVICE, AND HEATING CURRENT CONTROL METHOD FOR GAS SENSOR DEVICE

(71) Applicant: Hitachi Automotive Systems, Ltd., Hitachinaka-shi, Ibaraki (JP)

(72) Inventors: Hiroshi Nakano, Tokyo (JP); Masahiro Matsumoto, Tokyo (JP); Yasuo Onose, Hitachinaka (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 254 days.

(21) Appl. No.: 15/776,488

(22) PCT Filed: Oct. 26, 2016

(86) PCT No.: PCT/JP2016/081652
§ 371 (c)(1),
(2) Date: May 16, 2018

(87) PCT Pub. No.: WO2017/090362
PCT Pub. Date: Jun. 1, 2017

(65) Prior Publication Data
US 2018/0328872 A1  Nov. 15, 2018

(30) Foreign Application Priority Data
Nov. 27, 2015 (JP) .................. 2015-231181

(51) Int. Cl.
*G01N 25/18* (2006.01)
*G01N 25/58* (2006.01)
*G01N 27/18* (2006.01)

(52) U.S. Cl.
CPC ............. *G01N 25/18* (2013.01); *G01N 25/58* (2013.01); *G01N 27/18* (2013.01)

(58) Field of Classification Search
None
See application file for complete search history.

(56) References Cited

U.S. PATENT DOCUMENTS 7,165,441 B2 *  1/2007  Bauer .................... G01N 27/18
                                                   73/25.03
8,359,919 B2 *  1/2013  Matsumoto ............ G01N 27/18
                                                   73/204.26

(Continued)

FOREIGN PATENT DOCUMENTS

JP   2005-504291 A   2/2005
JP   2011-047868 A   3/2011

(Continued)

OTHER PUBLICATIONS

International Search Report with English translation and Written Opinion issued in corresponding application No. PCT/JP2016/081652 dated Feb. 14, 2017.

*Primary Examiner* — Jill E Culler
(74) *Attorney, Agent, or Firm* — Foley & Lardner LLP

(57) ABSTRACT

The purpose of the present invention is to provide a gas sensor device with which highly accurate measurement performance can be achieved even if there are changes in the environmental temperature. The present invention is provided with: a detection heater (3) formed in a thin film part; a temperature compensation heater (4) formed so as to surround the detection heater; a detection heater heating control circuit for controlling the heating temperature of the detection heater (3); and a temperature compensation heater heating control circuit for controlling the heating temperature of the temperature compensation heater to a heating temperature lower than the heating temperature of the detection heater. The detection heater heating control circuit and the temperature compensation heater heating control circuit adjust the respective heating currents in response to an (Continued)

increase in the temperature of a substrate, so as to reduce the temperature difference between the heating temperature of the detection heater (3) and the heating temperature of the temperature compensation heater (4).

9 Claims, 11 Drawing Sheets

(56) References Cited

U.S. PATENT DOCUMENTS

| | | | |
|---|---|---|---|
| 8,689,608 B2 * | 4/2014 | Nakano | G01N 25/18 |
| | | | 73/25.03 |
| 10,101,286 B2 * | 10/2018 | Nakano | G01N 25/18 |
| 2005/0028580 A1 | 2/2005 | Bauer et al. | |
| 2011/0048127 A1 | 3/2011 | Matsumoto et al. | |
| 2011/0154885 A1 | 6/2011 | Nakano et al. | |
| 2016/0033433 A1 | 2/2016 | Hiroshi et al. | |

FOREIGN PATENT DOCUMENTS

| JP | 2011-137679 A | 7/2011 |
|---|---|---|
| JP | 2014-178214 A | 9/2014 |

* cited by examiner

GAS SENSOR DEVICE, AND HEATING CURRENT CONTROL METHOD FOR GAS SENSOR DEVICE

TECHNICAL FIELD

The present invention relates to a gas sensor device provided with a sensor element for detecting physical quantities of gas, and a method of controlling heating currents of the gas sensor device.

BACKGROUND ART

A gas sensor device that measures physical quantities such as a moisture concentration of gas is used in various technical fields. In order to comply with exhaust gas regulations and to reduce fuel consumption, for example, physical quantities such as humidity, pressure, and temperature of intake air are measured in internal combustion engines for automobiles, and the measured physical quantities allow determination on an optimal amount of fuel consumption and time of ignition. Furthermore, in order to comply with increasingly tight exhaust gas regulations, it is required to measure physical quantities of gas with high accuracy so as to optimally drive internal combustion engines.

As an example of such a gas sensor device, JP 2011-137679 A (PTL 1) discloses a gas sensor device that includes a substrate having a hollow portion; a thin film support including a plurality of insulating layers laminated in the hollow portion; and first and second heaters sandwiched by the insulating layers of the thin film support. In this gas sensor device, the second heater is disposed around the first heater, and the first heater is controlled to be heated to a temperature higher than that of the second heater. Based on a radiation amount of the first heater, physical quantities such as humidity of gas are measured. Furthermore, in order to reduce measuring errors caused by changes in radiation amount of the first heater caused by temperature changes in ambient gas, the second heater is configured to maintain an ambient temperature of the first heater at a predetermined temperature so as to allow highly accurate measurement.

CITATION LIST

Patent Literature

PTL 1: JP 2011-137679 A

SUMMARY OF INVENTION

Technical Problem

For example, in a gas sensor device that measures physical quantities of intake air passing through an intake passage of an internal combustion engine, an ambient temperature of a place where the gas sensor device is disposed greatly changes depending on temperature changes caused by changes in running environment and depending on driving conditions such as the presence or absence of intake supercharging by a supercharger. Therefore, a gas sensor device requires a measurement accuracy good enough to respond to temperature changes.

The gas sensor device disclosed in PTL 1 uses the second heater to reduce measuring errors caused by changes in ambient temperature. Furthermore, in order to improve accuracy, what is important is temperature stability of a region heated by the second heater. A heating temperature of the second heater is detected by measuring resistance of the second heater, and a heat quantity is fed back.

However, a great change in ambient temperature causes a change in temperature distribution formed by the second heater and affects the first heater that detects physical quantities of gas, which causes measuring errors. In addition, the heating temperature of the second heater fluctuates due to temperature characteristics of a temperature control circuit.

An object of the present invention is to provide a novel gas sensor device which allows highly accurate measurement even with changes in ambient temperature, and to provide a method of controlling heating currents of the gas sensor device.

Solution to Problem

A feature of the present invention is a gas sensor device that measures physical quantities of gas based on a thin film formed in a part of a substrate; a detection heater formed in the thin film; a temperature compensation heater formed in the thin film so as to surround the detection heater; a detection heater-drive circuit configured to control a heating temperature of the detection heater; a temperature compensation heater-drive circuit configured to control a heating temperature of the temperature compensation heater to be set at a heating temperature lower than the heating temperature of the detection heater; and a radiation amount of the detection heater, wherein each of the detection heater-drive circuit and the temperature compensation heater-drive circuit controls a heating current so that a temperature difference between the heating temperature of the detection heater and the heating temperature of the temperature compensation heater reduces in response to a rise in temperature of the substrate.

Advantageous Effects of Invention

According to the present invention, a heating temperature of a detection heater is adjusted in response to a temperature decrease of an inner region of a temperature compensation heater, so that it is possible to suppress fluctuations in heat quantity of the detection heater caused by changes in ambient temperature, which reduces measuring errors.

DESCRIPTION OF EMBODIMENT

Hereinafter, an embodiment of the present invention will be described in detail with reference to the drawings. However, the present invention is not limited to the following embodiment and includes various modifications and applications in the technical concept of the present invention.

Figure 1:
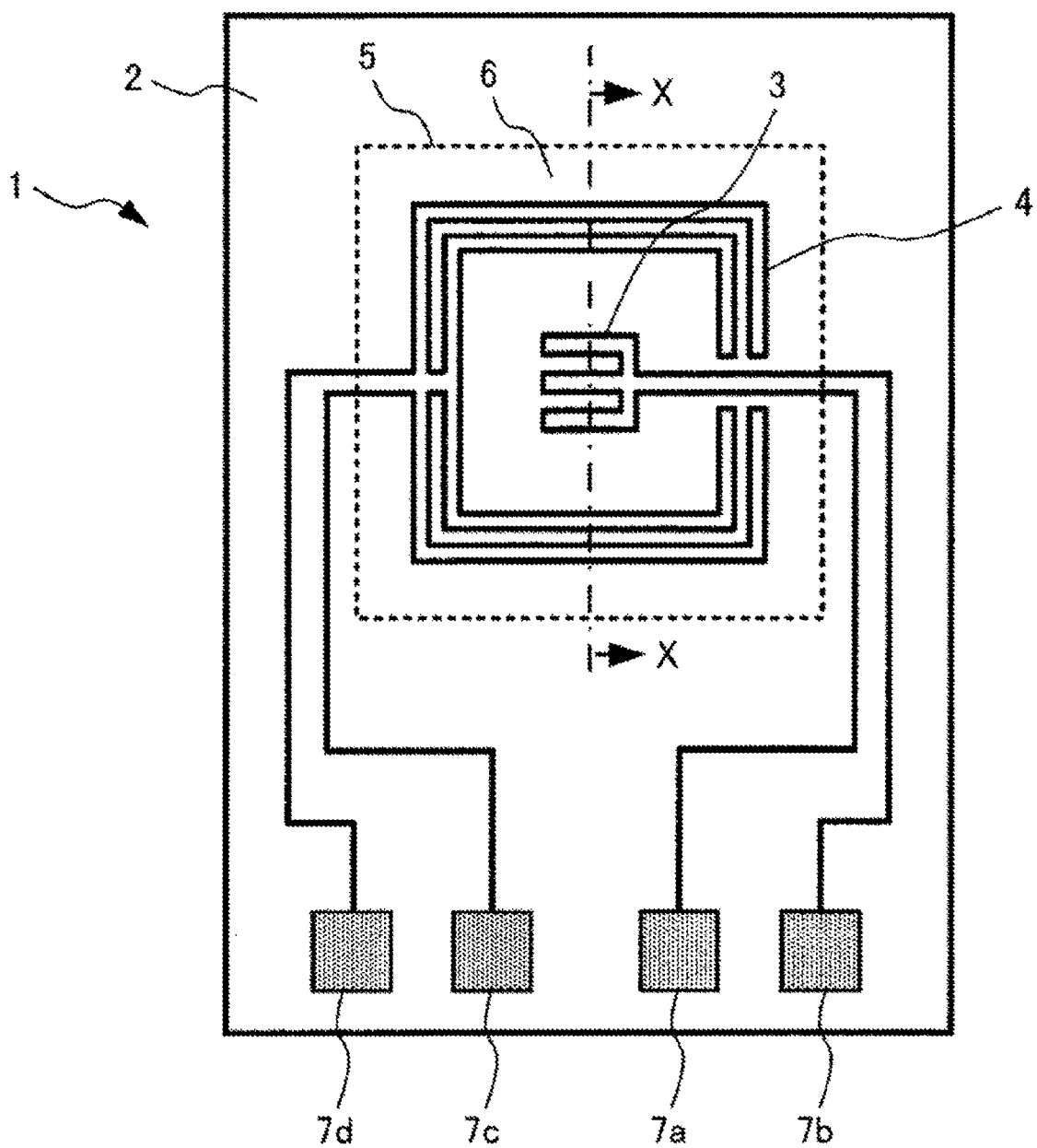
FIG. 1 is a plan view of a sensor element of a gas sensor device to which the present invention is applied.
Figure 2:
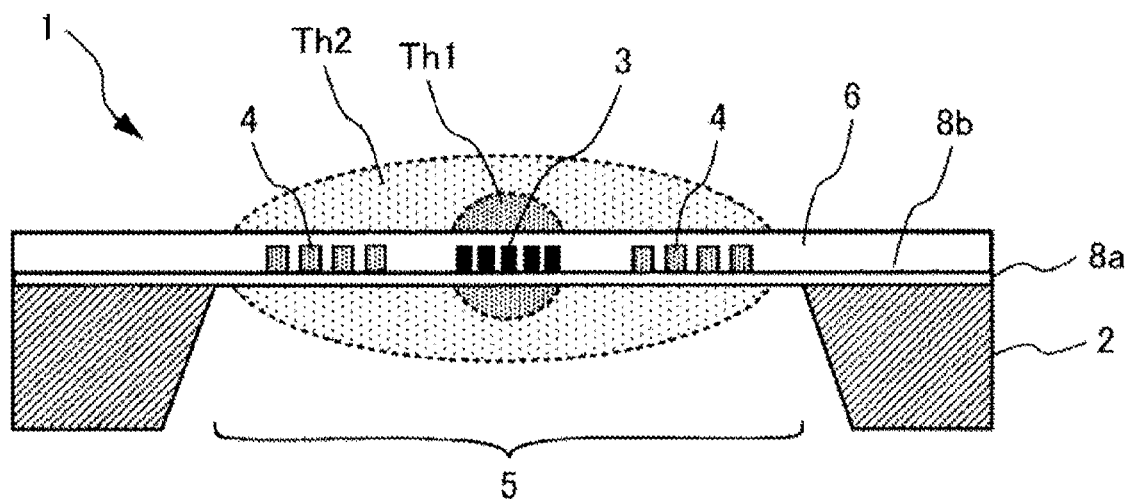
FIG. 2 is a cross-sectional view of the sensor element shown in FIG. 1 taken along line X-X.

Before describing the embodiment of the present invention, a configuration of a typical gas sensor device and problems thereof will hereinafter be described. FIG. 1 shows a plane of a sensor element in a typical gas sensor device, and FIG. 2 shows a cross section of FIG. 1 taken along line X-X. Hereinafter, a sensor element in a gas sensor device will be described with reference to FIGS. 1 and 2. It should be noted that a humidity sensor for measuring an amount of water contained in air will hereinafter be described as an example.

In FIGS. 1 and 2, a sensor element 1 includes a substrate 2 formed of single-crystal silicon. The substrate 2 is formed with a hollow portion 5. In this hollow portion 5, a detection heater 3 serving as a first heater and a temperature compensation heater 4 serving as a second heater are laid. Furthermore, a thin film support 6 that supports these heaters 3 and 4 is formed to cover the hollow portion 5 of the substrate 2.

As shown in FIG. 2, the thin film support 6 includes insulating layers 8a and 8b laminated on an upper surface of the substrate 2. Between these insulating layers 8a and 8b, the detection heater 3 and the temperature compensation heater 4 are interposed and supported. The temperature compensation heater 4 is disposed to surround the detection heater 3. Furthermore, the detection heater 3 and the temperature compensation heater 4 consist of fine-width resistors extending along the plane of the thin film support 6 and having a plurality of folded portions.

As the temperature compensation heater 4 is disposed to surround the detection heater 3 in this manner, an ambient temperature of the detection heater 3 is maintained at a heating temperature (Th2) of the temperature compensation heater 4, which allows reduction of influences due to changes in ambient temperature (Ta). The detection heater 3 and the temperature compensation heater 4 are electrically connected to electrodes 7a, 7b, 7c, and 7d formed on the substrate 2 for connection with an external circuit.

The detection heater 3 and the temperature compensation heater 4 includes the same material. For example, platinum (Pt), tantalum (Ta), molybdenum (Mo), and silicon (Si) are selected as materials having stability in high temperatures (materials having high melting points). With regard to the insulating layers 8a and 8b, silicon oxide ($SiO_2$) and silicon nitride ($Si_3N_4$) are disposed in a state of single layer or laminated layer. In addition, resin materials such as polyimide, or ceramics or glass may be disposed in a state of single layer or laminated layer as the insulating layers 8a and 8b. With regard to the electrodes 7a, 7b, 7c, and 7d, aluminum (Al) or the like is used.

The sensor element 1 is formed by semiconductor microfabrication technology utilizing photolithography and by anisotropic etching technology. The hollow portion 5 is formed as the single-crystal silicon substrate 2 is subjected to anisotropic etching, isotropic etching, or the like. In order to protect the electrodes 7a to 7d, it is preferable to form a protective layer on a surface of the sensor element 1, and then, conduct anisotropic etching.

As shown in FIG. 2, a heated area of the heating temperature (Th2) is formed in an inner region by the temperature compensation heater 4, and a heated area of a heating temperature (Th1) is formed in a proximal region of the detection heater 3. Accordingly, the heated area of the heating temperature (Th1) is included in the heated area of the heating temperature (Th2), which enables to reduce influences of ambient temperature in the heated area of the heating temperature (Th1).

Figure 3:
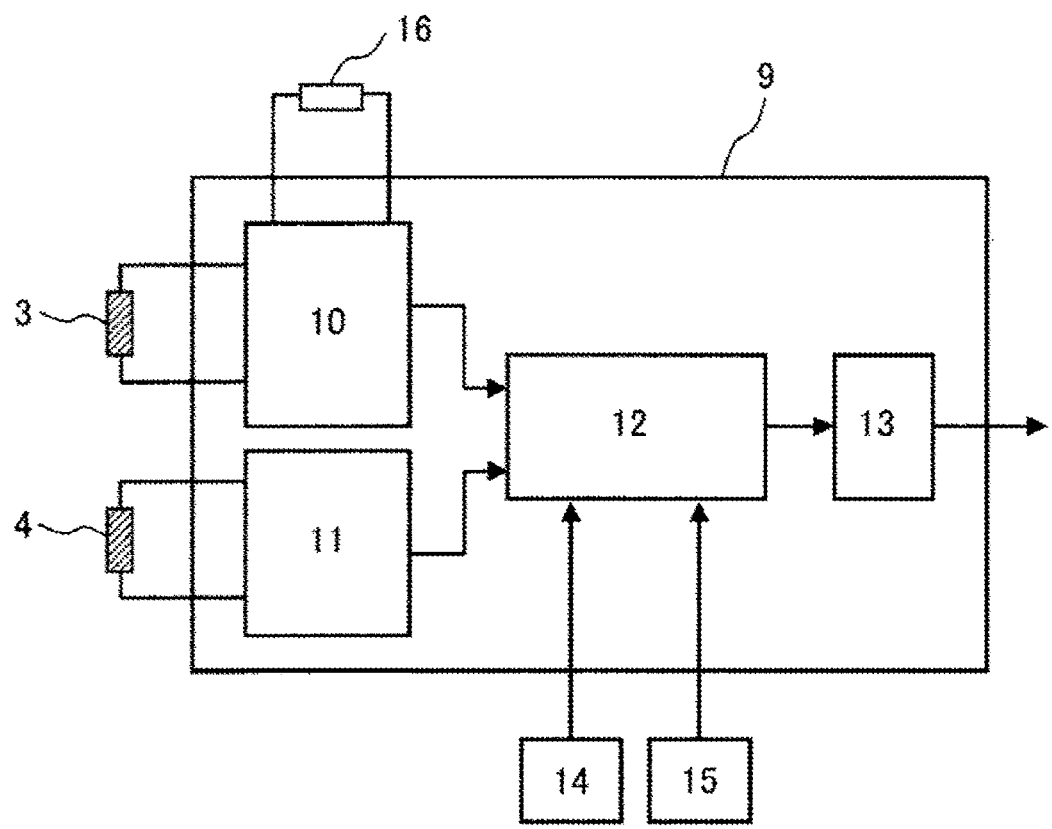
FIG. 3 is a circuit diagram showing a configuration of a drive circuit of the sensor element shown in FIG. 1.

FIG. 3 shows a drive circuit of the gas sensor device. A drive circuit 9 of the sensor element 1 includes at least heating control circuits 10 and 11, a correction computing circuit 12, and an output circuit 13. The heating control circuit 10 detects a temperature of the detection heater 3 and supplies heating currents controlled by feedback so as to keep the temperature of the detection heater 3 at the heating temperature (Th1). In addition, the heating control circuit 10 is connected to a temperature-sensitive element 16 for detecting the ambient temperature (Ta). Furthermore, the heating control circuit 11 detects a temperature of the temperature compensation heater 4 and supplies heating currents controlled by feedback so as to keep the temperature of the temperature compensation heater 4 at the heating temperature (Th2).

A signal corresponding to a heat quantity, or humidity, of the detection heater 3 in the heating control circuit 10 is input to the correction computing circuit 12. In addition, a signal from the heating control circuit 11 is input to the correction computing circuit 12. Those signals can be used, for example, to monitor an operational state. Furthermore, with the input of detection values of a temperature sensor and a pressure sensor 15 which are provided separately from the correction computing circuit 12, the correction computing circuit 12 is capable of interaction correction of detection values regarding humidity, temperature, pressure, and the like. Since this correction is not directly related to the present invention, description thereof will be omitted. An output signal of the correction computing circuit 12 is transmitted to the output circuit 13 and is converted into an analog signal or a digital signal for communication, and the converted signal is transmitted to the outside.

The heating control circuit 10 detects a temperature of the detection heater 3 and supplies heating currents so as to keep the temperature of the detection heater 3 at the heating temperature (Th1). Similarly, the heating control circuit 11 detects a temperature of the temperature compensation heater 4 and supplies heating currents so as to keep the temperature of the temperature compensation heater 4 at the heating temperature (Th2). For example, the heating temperature (Th1) is about 500° C., and the heating temperature (Th2) is about 300° C.

Hereinafter described is temperature distributions of the detection heater 3 and the temperature compensation heater 4 controlled in the aforementioned manner. The ambient temperature (Ta) is a temperature of an environment where the sensor element 1 is disposed. The gas sensor device in this embodiment is configured to measure humidity of intake air of an internal combustion engine, so that the gas sensor device is disposed in an intake passage through which the intake air flows. It should be noted the sensor element 1 is disposed in a region where the intake air does not flow because a radiation amount largely fluctuates when the sensor element 1 is influenced by a flow of the intake air.

It is known that the aforementioned ambient temperature (Ta) fluctuates between −40° C. and +125° C. when a gas sensor device is disposed in an intake passage of an internal combustion engine for automobiles. Therefore, in such changes in ambient temperature, the temperature of the temperature compensation heater 4 is maintained substantially at the heating temperature (Th2) even when the ambient temperature (Ta) fluctuates. In addition, the detection heater 3 is heated to the heating temperature (Th1) which is higher than the heating temperature (Th2).

Herein, a radiation amount Q1 from the detection heater 3 to the intake air and a radiation amount Q2 from the temperature compensation heater 4 to the intake air are proximately represented by the following formulae.

$$Q1 = \lambda \cdot S_1 \cdot (Th1 - Th2)$$

$$Q2 = \lambda \cdot S_2 \cdot (Th2 - Ta)$$

It should be noted that λ is a parameter which depends on thermal conductivity of air and changes with humidity. S1 represents a heat radiation area of the detection heater, and S2 represents a heat radiation area of the temperature compensation heater.

As can be seen from the above formulae, when the ambient temperature (Ta) changes, the radiation amount Q2 of the temperature compensation heater 4 fluctuates, but the detection heater 3 is exposed to an environment of the substantially constant heating temperature (Th2), so that the radiation amount Q1 of the detection heater 3 can be regarded as not being affected by the ambient temperature (Ta). Therefore, if the heating temperature (Th1) and the heating temperature (Th2) are constant, the radiation amount Q1 of the detection heater 3 depends on A. As A changes with humidity, the radiation amount Q1 is based on humidity.

Figure 4:
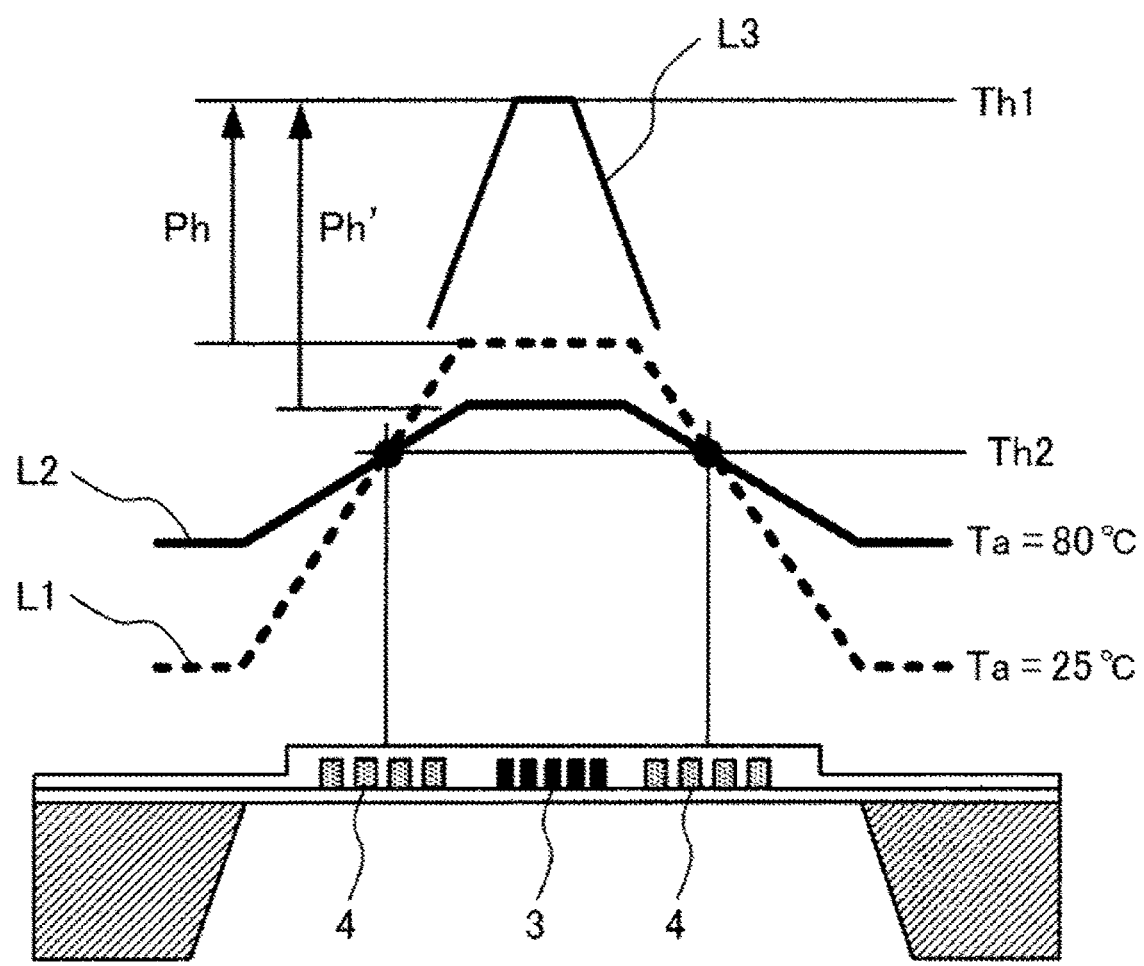
FIG. 4 is an explanatory view showing that the sensor element is being heated.

Hereinafter described are problems in a gas sensor device that conducts such operations. FIG. 4 shows that the temperature distribution formed by heating from the temperature compensation heater 4 changes based on ambient temperatures.

In FIG. 4, L1 represents a compensated temperature distribution line showing an amount of rise in temperature caused by the temperature compensation heater 4 when the ambient temperature (Ta) is 25° C. L2 represents a compensated temperature distribution line showing an amount of rise in temperature caused by the temperature compensation heater 4 when the ambient temperature (Ta) is 80° C. Herein, the compensated temperature distribution lines L1 and L2 are equivalent to a temperature distribution when only the temperature compensation heater 4 generates heat, while the detection heater 3 stops heating.

Comparing the compensated temperature distribution line L1 to the compensated temperature distribution line L2, both lines are maintained at the heating temperature (Th2) at the position where the temperature compensation heater 4 is disposed. However, in the inner region surrounded by the temperature compensation heater 4, when the ambient temperature (Ta) rises to 80° C., the temperature in the inner region surrounded by the temperature compensation heater 4 tends to decrease, as compared with a case where the ambient temperature (Ta) is 25° C. Furthermore, when the ambient temperature (Ta) rises, tendency of temperature changes becomes gentler in the compensated temperature distribution line L2 than in the compensated temperature distribution line L1, and the temperature distribution formed by the temperature compensation heater 4 changes. Therefore, since the detection heater 3 is inwardly surrounded by the temperature compensation heater 4, the detection heater 3 is influenced by the aforementioned changes in ambient temperature.

In driving the detection heater 3, a state of the temperature heated by the temperature compensation heater 4 rises to the heating temperature (Th1) at the time of driving the detection heater 3, and a heat quantity as represented by a detected temperature distribution line L3 in the drawing is added. When the heating temperature (Th1) of the detection heater 3 is a fixed value, the heat quantity of the detection heater 3 is Ph in the drawing at the ambient temperature (Ta) equal to 25° C. On the other hand, at the ambient temperature (Ta) equal to 80° C., the temperature in the inner region of the temperature compensation heater 4 decreases, so that the heat quantity of the detection heater 3 increases to Ph'.

Therefore, in such manners, since humidity depends on changes in heat quantity (=the radiation amount Q1) of the detection heater 3, the changes in ambient temperature cause fluctuations in heat quantity of the detection heater 3, which generates measuring errors of humidity.

In order to reduce the measuring errors caused by the changes in ambient temperature, the embodiment of the present invention proposes a configuration as shown in FIG. 5 to FIG. 10.

First, the concept of the embodiment of the present invention will be described with reference to FIG. 5. As described above, the compensated temperature distribution line L1 represents the compensated temperature distribution line showing the amount of rise in temperature caused by the temperature compensation heater 4 when the ambient temperature (Ta) is 25° C. Furthermore, the compensated temperature distribution line L2 represents the compensated temperature distribution line showing the amount of rise in temperature caused by the temperature compensation heater 4 when the ambient temperature (Ta) is 80° C.

In driving the detection heater 3, when the ambient temperature (Ta) is 25° C., the state of temperature heated by the temperature compensation heater 4 rises to the heating temperature (Th1) at the time of driving the detection heater 3, and the heat quantity as represented by the detected temperature distribution line L3 in the drawing is added, so that the heat quantity of the detection heater 3 becomes equivalent to Ph in the drawing.

On the other hand, when the ambient temperature (Ta) rises to 80° C., the temperature of the detection heater 3 is changed and adjusted to a heating temperature (Th1') which is lower than the heating temperature (Th1) as in a detected temperature distribution line L4. Accordingly, the heating temperature of the detection heater 3 is decreased in response to a temperature decrease of the inner region of the temperature compensation heater 4, so that the heat quantity becomes equivalent to Ph'. In this case, the heat quantity Ph≈the heat quantity Ph'. Thus, it is possible to suppress fluctuations in heat quantity of the detection heater 3 caused by changes in ambient temperature, which leads to reduction in measuring errors.

Figure 6:
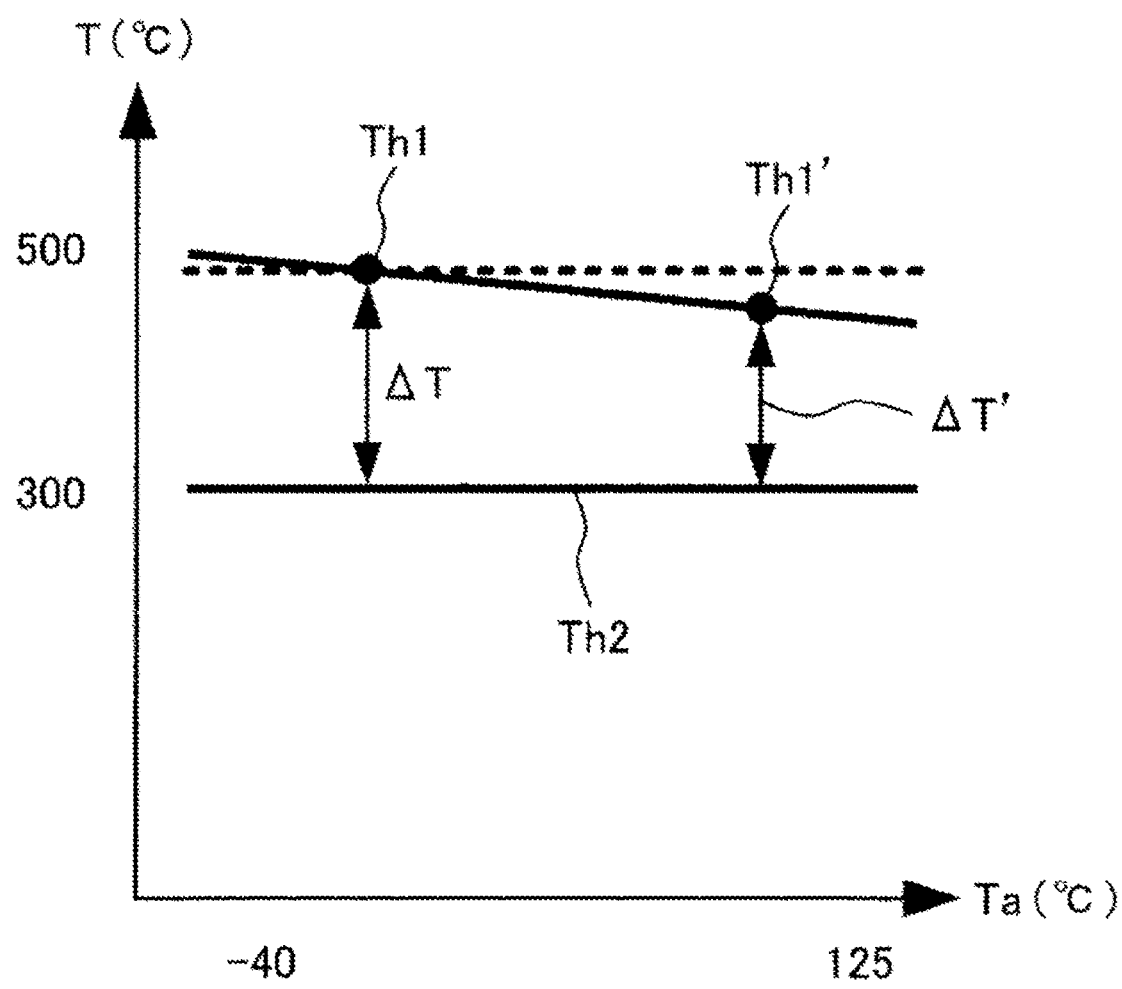
FIG. 6 is an explanatory view further showing temperature changes of the sensor element of the present invention.

FIG. 6 shows temperature changes of the detection heater 3 and the temperature compensation heater 4 due to changes in ambient temperature (Ta). In this embodiment, when the ambient temperature (Ta) rises, the heating temperature (Th2) of the temperature compensation heater 4 is controlled to be substantially constant, but the detection heater 3 has a negative temperature dependency so that the heating temperature (Th1) decreases to the heating temperature (Th1') along with the rise of the ambient temperature (Ta). In other words, as the ambient temperature (Ta) rises, a temperature difference ΔT between the detection heater 3 and the temperature compensation heater 4 reduces to ΔT'.

Figure 7:
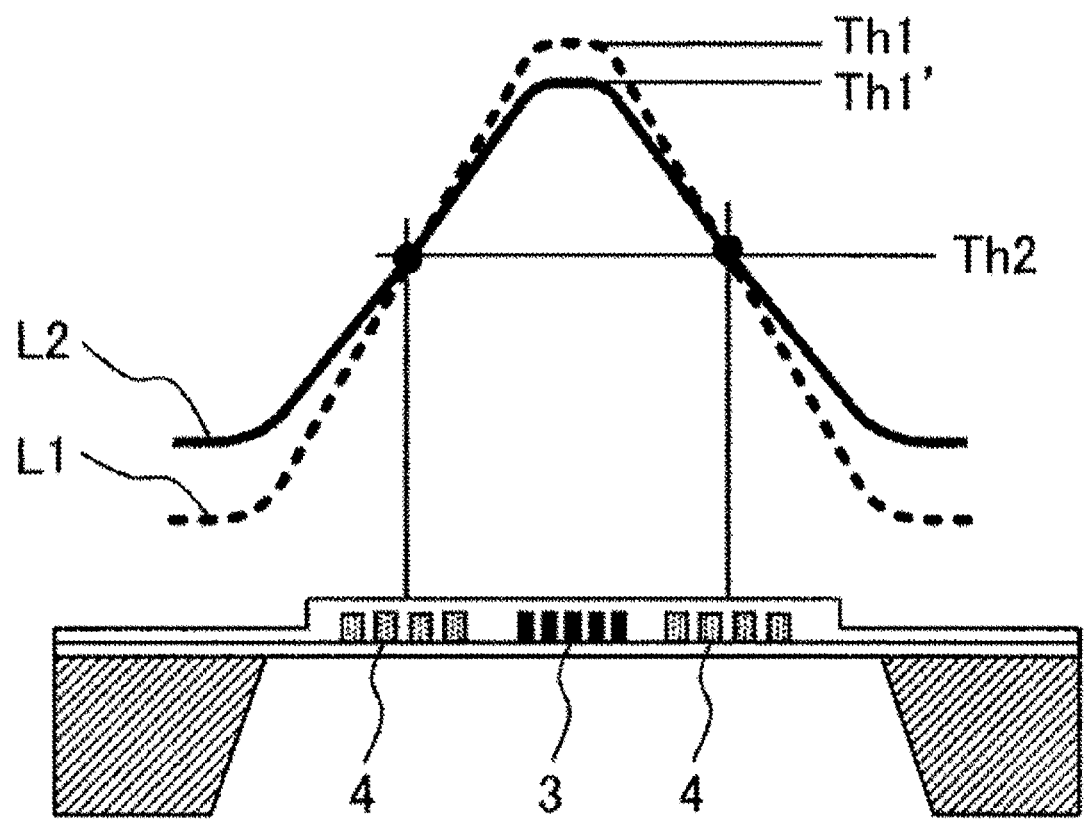
FIG. 7 is an explanatory view showing temperature changes of the entire sensor element of the present invention.

FIG. 7 shows a changing state of the temperature distributions of the entire sensor element 1 in this embodiment. When measuring humidity, both of the detection heater 3 and the temperature compensation heater 4 are driven so that the temperature distributions have a peak at the position of the detection heater 3. When the ambient temperature (Ta) rises, the heating temperature (Th2) at the position of the temperature compensation heater 4 changes slightly, while the temperature at the position of the detection heater 3 drops largely from the heating temperature (Th1) to the heating temperature (Th1'). Such temperature dependency of a temperature distribution allows highly accurate measurement.

Herein, the ambient temperature (Ta) is preferably a temperature detected from the substrate 2 which is at an ambient temperature of the detection heater 3 and the temperature compensation heater 4. Therefore, in this embodiment, the heating temperature (Th1) of the detection heater 3 is controlled by the temperature of the substrate 2. The temperature of the substrate 2 can be controlled by changing resistance of a bridge circuit included in the heating control circuit of the detection heater 3 depending on temperatures.

Therefore, it is sufficient to form a temperature-dependent resistor on the substrate of the sensor element 1 behaving as a resistor of the bridge circuit that detects the temperature of the substrate 2. Usable examples of the temperature-dependent resistor include Si diffusion layer having high temperature coefficient of resistance, polycrystalline silicon, platinum, and Mo. In this embodiment, the temperature-dependent resistor is formed of the same material as the detection heater 3 from a manufacturing point of view.

Herein, as a method of detecting the ambient temperature (Ta), a thermistor or the like provided separately from the sensor element 1 can be used. However, in a case where the thermistor is provided separately, an ambient temperature of the sensor element 1 may differ from a temperature of the thermistor due to a sudden change in ambient temperature, or heat conduction from the outside of the sensor device. Therefore, for the purpose of higher accuracy, it is preferable to use the temperature of the substrate detected by the temperature-dependent resistor formed on the sensor element 1.

As described above, when the temperature of the temperature compensation heater 4 is maintained at the substantially constant heating temperature (Th2) in response to the changes in the ambient temperature (Ta), a rise in the ambient temperature (Ta) tends to decrease the temperature in the inner region of the temperature compensation heater 4. An amount of decrease in this temperature changes based on a shape of the sensor element 1, a size of the temperature compensation heater 4, a positional relationship between the detection heater 3 and the temperature compensation heater 4, and the like. Therefore, it is preferable that the heating temperature (Th1, Th1') of the detection heater 3 that changes based on the ambient temperature (Ta) is appropriately set depending on the shape of the sensor element 1, the size and the position of the temperature compensation heater 4.

Based on the aforementioned concept of this embodiment, a specific configuration of this embodiment will hereinafter be described with reference to FIGS. 8 to 10.

Figure 8:
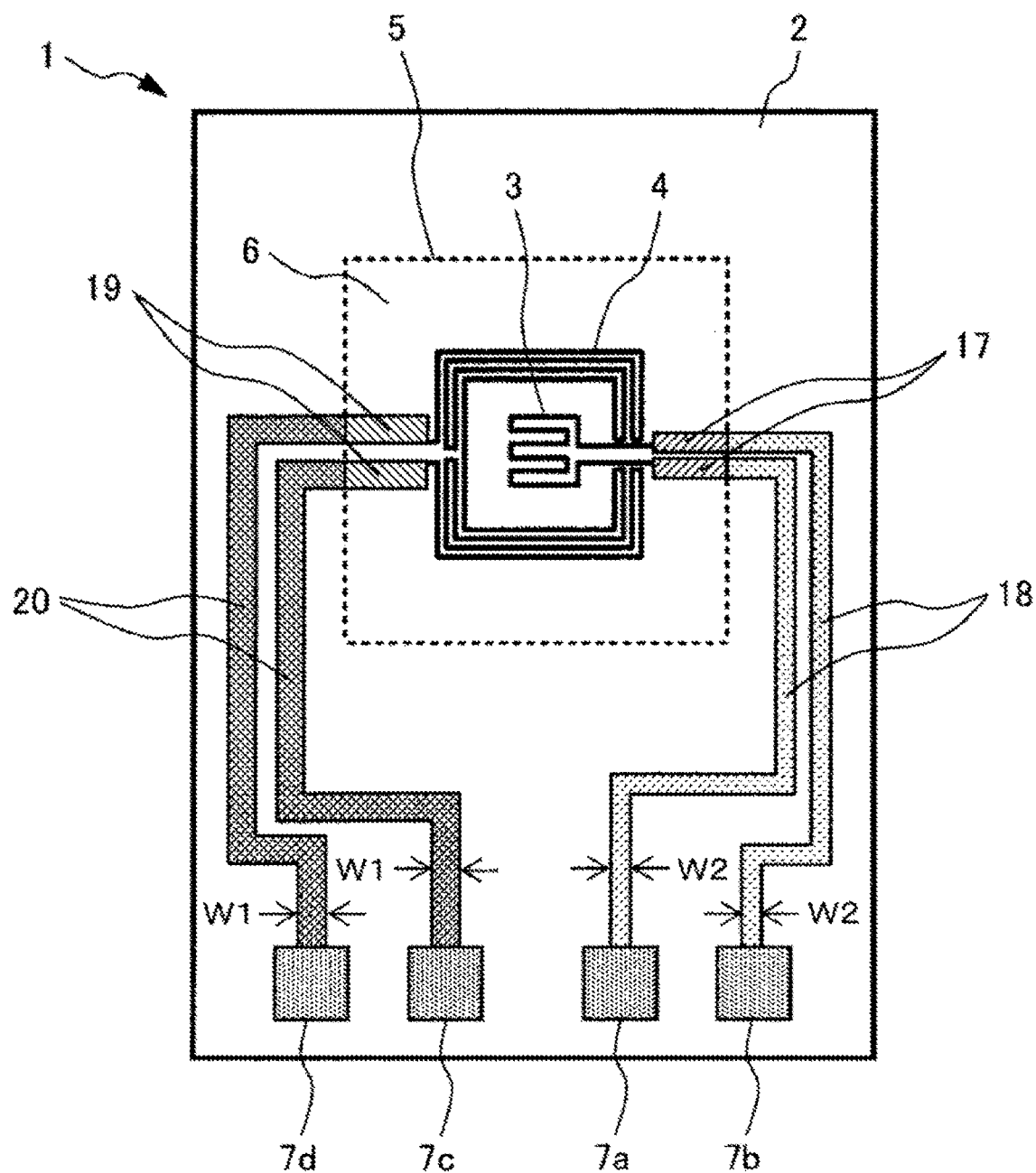
FIG. 8 is a plan view of a sensor element according to an embodiment of the present invention.

FIG. 8 shows a configuration of the sensor element 1 according to this embodiment. The detection heater 3 is connected to the electrodes 7a and 7b which are drawn out by a wire 17 placed on the thin film support 6 on the hollow portion 5 and by a wire 18 placed on the substrate 2. The wires 17 and 18 include the same material as the detection heater 3. For example, platinum (Pt), tantalum (Ta), molybdenum (Mo), and silicon (Si) are selected. In other words, the wires 17 and 18 function as temperature-dependent resistors. Hereinafter, the wires 17 and 18 may also be referred to as temperature-dependent resistors 17 and 18. Furthermore, the temperature-dependent resistors 17 and 18 have such an effect in manufacturing that those members can be manufactured simultaneously with the detection heater 3 in the same manufacturing processes.

Similarly, the temperature compensation heater 4 is disposed to surround the detection heater 3 from the outside and is connected to the electrodes 7c and 7d which are drawn out by a wire 19 placed on the thin film support 6 on the hollow portion 5 and by a wire 20 placed on the substrate 2. The wires 19 and 20 include the same material as the temperature compensation heater 4. For example, platinum (Pt), tantalum (Ta), molybdenum (Mo), and silicon (Si) are selected. In other words, the wires 19 and 20 function as temperature-dependent resistors. Hereinafter, the wires 19 and 20 may also be referred to as temperature-dependent resistors 19 and 20. Furthermore, as similar to the detection heater 3, the temperature-dependent resistors 19 and 20 also have such an effect in manufacturing that those members can be manufactured simultaneously with the temperature compensation heater 4 in the same manufacturing processes.

Herein, widths of the wires 17, 18, 19, and 20 are determined in such a manner that resistance of the wires 17 and 18 between the detection heater 3 and the electrodes 7a, 7b become larger than resistance of the wires 19 and 20 between the temperature compensation heater 4 and the electrodes 7c, 7d. In other words, as can be seen from FIG. 8, each width W2 of the wires 17 and 18 is narrower than each width W1 of the wires 19 and 20. The reason for this arrangement will be explained in detail with reference to FIG. 9.

Figure 9:
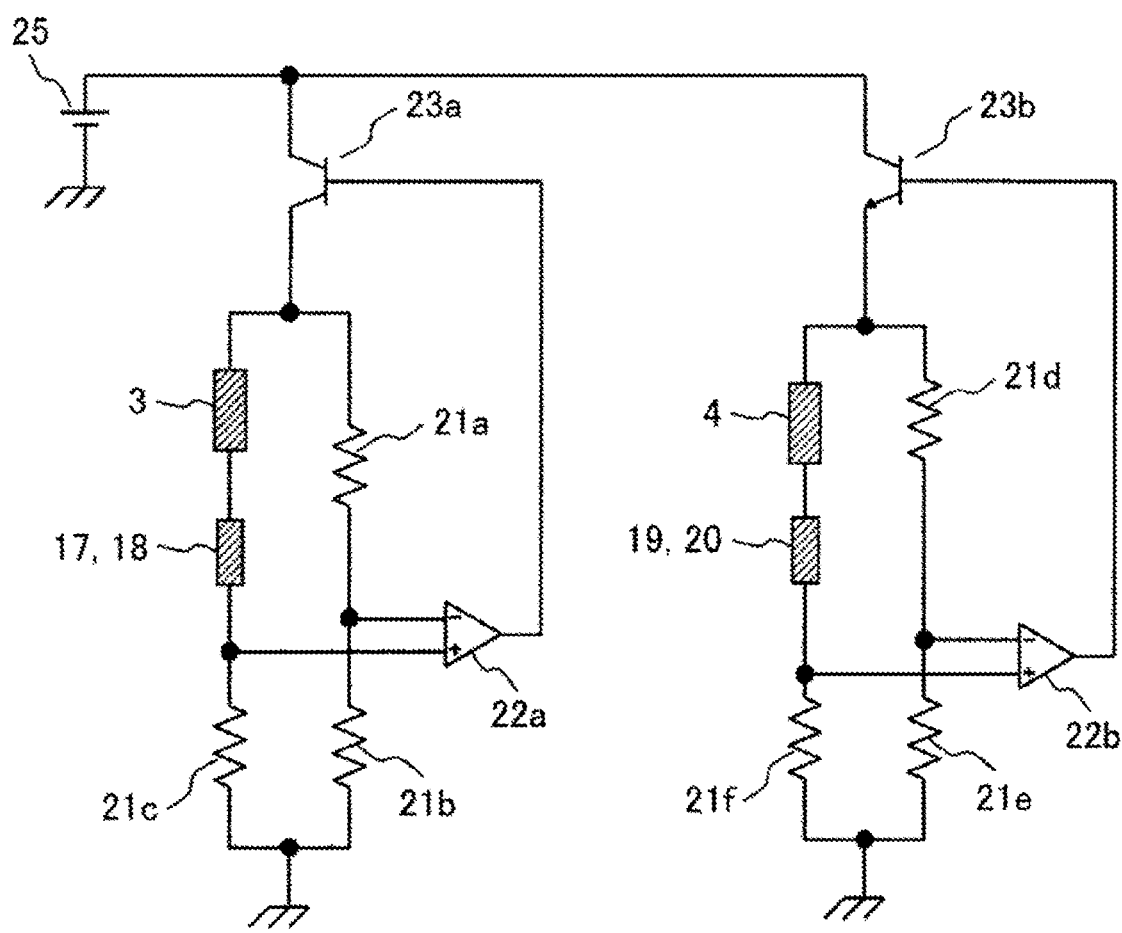
FIG. 9 is a circuit diagram showing a drive circuit of the sensor element shown in FIG. 8.

FIG. 9 shows a configuration of a drive circuit in this embodiment. The detection heater 3 to which the temperature-dependent resistors (wires) 17, 18 are connected is included, together with fixed resistors 21a, 21b, and 21c, in a bridge circuit or a detection heater-heating control circuit. The bridge circuit includes a series circuit consisting of a first side to which the detection heater 3 and the temperature-dependent resistors (wires) 17, 18 are connected in series, and a second side including the fixed resistor 21c connected to the first side in series. The bridge circuit includes another series circuit in which a third side of the fixed resistor 21a and a fourth side of the fixed resistor 21b are connected in series.

A potential between the detection heater 3 including the temperature-dependent resistors 17, 18 and the fixed resistor 21c (a potential between the first side and the second side) and a potential between the fixed resistors 21a and 21b (a potential between the third side and the fourth side) are input to a differential amplifier 22a. The differential amplifier 22a outputs a voltage corresponding to a difference between input voltages to a base electrode of a transistor 23a. The transistor 23a controls currents that flow between a collector and an emitter based on the output value of the differential amplifier 22a. The emitter electrode of the transistor 23a is connected between the detection heater 3 and the fixed resistor 21a, and the collector electrode thereof is connected to a power supply 24. With this configuration, the temperature of the detection heater 3 is controlled by feedback and set at about 500° C.

The temperature of the detection heater 3 is set in such a manner that a resistance ratio between the detection heater 3 and the fixed resistor 21c from the known temperature coefficient of resistance of the detection heater 3 to 500° C. coincides with a resistance ratio between the fixed resistor 21a and the fixed resistor 21b. When the temperature of the detection heater 3 is lower than 500° C., the transistor 23a is turned on to increase heating currents.

Similarly, the temperature compensation heater 4 to which the temperature-dependent resistors (wires) 19, 20 are connected is included, together with fixed resistors 21d, 21e, and 21f, in a bridge circuit or a temperature compensation heater-heating control circuit. The bridge circuit includes a series circuit consisting of a first side to which the temperature compensation heater 4 and the temperature-dependent resistors (wires) 19, 20 are connected in series, and a second side including the fixed resistor 21f connected to the first side in series. The bridge circuit includes another series circuit in which a third side of the fixed resistor 21d and a fourth side of the fixed resistor 21e are connected in series.

A potential between the temperature compensation heater 4 including the temperature-dependent resistors 19, 20 and the fixed resistor 21f (a potential between the first side and the second side) and a potential between the fixed resistors 21d and 21e (a potential between the third side and the fourth side) are input to a differential amplifier 22b. The differential amplifier 22b outputs a voltage corresponding to a difference between input voltages to a base electrode of a transistor 23b. The transistor 23b controls currents that flow between a collector and an emitter based on the output value of the differential amplifier 22b. The emitter electrode of the transistor 23b is connected between the temperature compensation heater 4 and the fixed resistor 21d, and the collector electrode thereof is connected to the power supply 24. With this configuration, the temperature of the temperature compensation heater 4 is controlled by feedback and set at about 300° C.

The temperature of the temperature compensation heater 4 is set in such a manner that a resistance ratio between the temperature compensation heater 4 and the fixed resistor 21f from the known temperature coefficient of resistance of the temperature compensation heater 4 to 300° C. coincides with a resistance ratio between the fixed resistor 21d and the fixed resistor 21e. When the temperature of the temperature compensation heater 4 is lower than 300° C., the transistor 23b is turned on to increase heating currents.

In such a configuration of the bridge circuit as described above, the heating currents are controlled so that an overall resistance including the detection heater 3 and the temperature-dependent resistors 17, 18 becomes constant. The overall resistance Rh' of the detection heater 3 including the temperature-dependent resistors 17 and 18 is expressed in the following formula: Rh'=Rh+r17+r18. Herein, Rh represents the resistance of the detection heater 3, r17 represents the resistance of the temperature-dependent resistor 17, and r18 represents the resistance of the temperature-dependent resistor 18. The resistance Rh of the detection heater 3 is the resistance of the region surrounded by the temperature compensation heater 4.

Herein, based on the measurement results on the temperature distributions of the sensor element 1, the temperature of the temperature-dependent resistor 18, or the wire placed on the substrate 2, is found to depend on the ambient temperature (Ta), and the temperature of the temperature-dependent resistor 17, or the wire placed on the thin film support 6, is considered as an intermediate temperature between the temperature (Th2) of the temperature compensation heater 4 and the ambient temperature (Ta). Taking the temperature dependency of each resistor into consideration, the total resistance Rh' of the detection heater 3 is expressed by the following formula.

[Mathematical Formula 1]

$$R'_h = R_h(1 + \alpha T_{h1}) + r_{17}\left(1 + \alpha \frac{T_{h2} - T_a}{2}\right) + r_{18}(1 + \alpha T_a) \qquad (1)$$

It should be noted that a represents the temperature coefficient of resistance, Th1 represents the heating temperature of the detection heater 3, Th2 represents the heating temperature of the temperature compensation heater 4, and Ta represents the ambient temperature (the temperature of the substrate 2).

In driving the detection heater 3 and the temperature compensation heater 4, heating currents flow in each bridge circuit, and the heating temperature Th1 of the detection heater 3 and the heating temperature Th2 of the temperature compensation heater 4 are increased and maintained at Rh' when the heating temperature Th1 of the detection heater 3 is at 500° C. and the heating temperature Th2 of the temperature compensation heater 4 is at 300° C.

In the above formula, a rise in the ambient temperature (Ta) raises the temperatures of the wires 17 and 18, or the temperature-dependent resistors, and increases values of second and third terms on the right-hand side. Accordingly, in order to make the overall resistance Rh' constant, the heating currents decrease as the heating temperature Th1 of the detection heater 3 decreases.

Similarly, with regard to the temperature compensation heater 4, a total resistance Rs' of the temperature compensation heater 4 is expressed by the following formula.

[Mathematical Formula 2]

$$R'_s = R_s(1 + \alpha T_{h2}) + r_{19}\left(1 + \alpha \frac{T_{h2} - T_a}{2}\right) + r_{20}(1 + \alpha T_a) \qquad (2)$$

It should be noted that Rs represents the resistance of the temperature compensation heater 4, a represents the temperature coefficient of resistance, Th2 represents the heating temperature of the temperature compensation heater 4, and Ta represents the ambient temperature (the temperature of the substrate 2).

As can be seen from the above formula, driving the detection heater 3 and the temperature compensation heater 4 leads to a rise in the ambient temperature (Ta), which raises the temperatures of the wires 19 and 20, or the temperature-dependent resistors, and increases values of second and third terms on the right-hand side. Thus, in order to make the overall resistance Rs' constant, the heating currents decrease as the heating temperature Th2 of the temperature compensation heater 4 decreases.

As described above, when the temperature-dependent resistors 17 and 18 are connected to the detection heater 3, the heating temperature (Th1) of the detection heater 3 fluctuates depending on ambient temperatures. Similarly, when the temperature-dependent resistors 19 and 20 are connected to the temperature compensation heater 4, the heating temperature (Th2) of the temperature compensation heater 4 fluctuates depending on ambient temperatures.

In this embodiment, changes in the heating temperature Th2 of the temperature compensation heater 4 caused by the temperature-dependent resistors 19 and 20 is set to be small, and reversely, changes in the heating temperature (Th1) of the detection heater 3 caused by the temperature-dependent resistors 17 and 18 is set to be larger than the temperature changes of the temperature compensation heater 4.

Specifically, the resistance of the temperature-dependent resistors 17, 18 and the resistance of the temperature-dependent resistors 19, 20 may be set so as to establish a relationship of (r17+r18)/(Rh)>(r19+r20)/(Rs), where (r17+r18)/(Rh) represents a resistance ratio between the temperature-dependent resistors 17, 18 and the detection heater 3, and similarly, (r19+r20)/(Rs) represents a resistance ratio between the temperature-dependent resistors 19, 20 and the temperature compensation heater 4.

Therefore, in this embodiment, the width W2 of the wires 17, 18 is formed narrower than the width W1 of the wires 19, 20 as shown in FIG. 8, so that the resistance of the wires 17, 18 between the detection heater 3 and the electrodes 7a, 7b becomes larger than the resistance of the wires 19, 20 between the temperature compensation heater 4 and the electrodes 7c, 7d. Accordingly, it is possible to increase the temperature dependency of the detection heater 3 with respect to fluctuations in ambient temperature.

Figure 10:
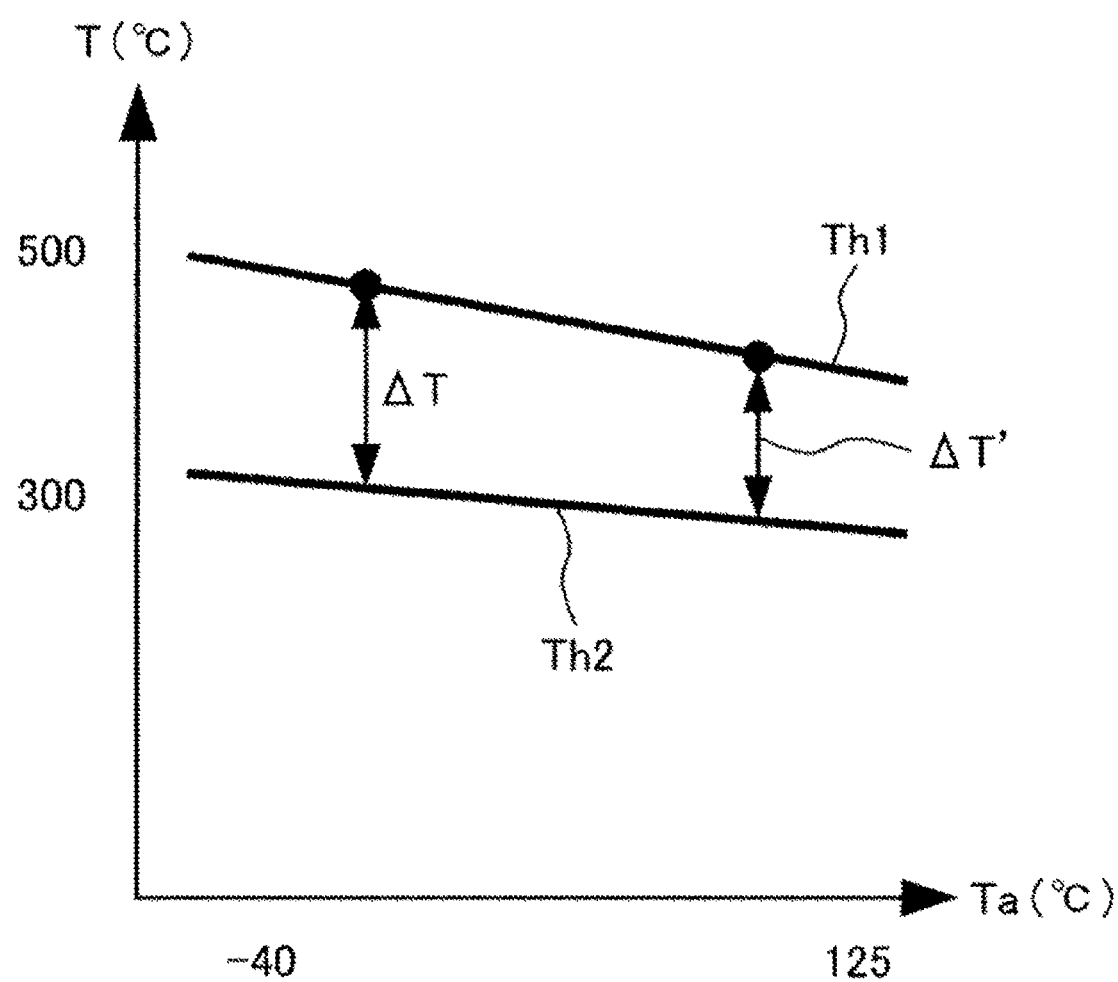
FIG. 10 is an explanatory view showing temperature dependency relative to changes in ambient temperature in the embodiment shown in FIG. 8.

FIG. 10 shows the temperature dependency of the detection heater 3 and that of the temperature compensation heater 4 according to this embodiment with respect to changes in ambient temperature. The heating temperature (Th2) shown in FIG. 10 represents temperature changes of the temperature compensation heater 4. As the ambient temperature (Ta) rises, the resistance of the temperature-dependent resistors 19 and 20 or the wires increases, and the heating currents decrease, which decreases the heating temperature (Th2).

With regard to the heating temperature (Th1), it represents temperature changes of the detection heater 3. As the ambient temperature (Ta) rises, the resistance of the temperature-dependent resistors 17 and 18 or the wires increases, and the heating currents decrease, which decreases the heating temperature (Th1). As understood from the above description, the amount of decrease in the heating temperature (Th1) is larger than that in the heating temperature (Th2), so that a difference between the heating temperature (Th1) of the detection heater 3 and the heating temperature (Th2) of the temperature compensation heater 4 reduces from $\Delta T$ to $\Delta T'$.

Figure 5:
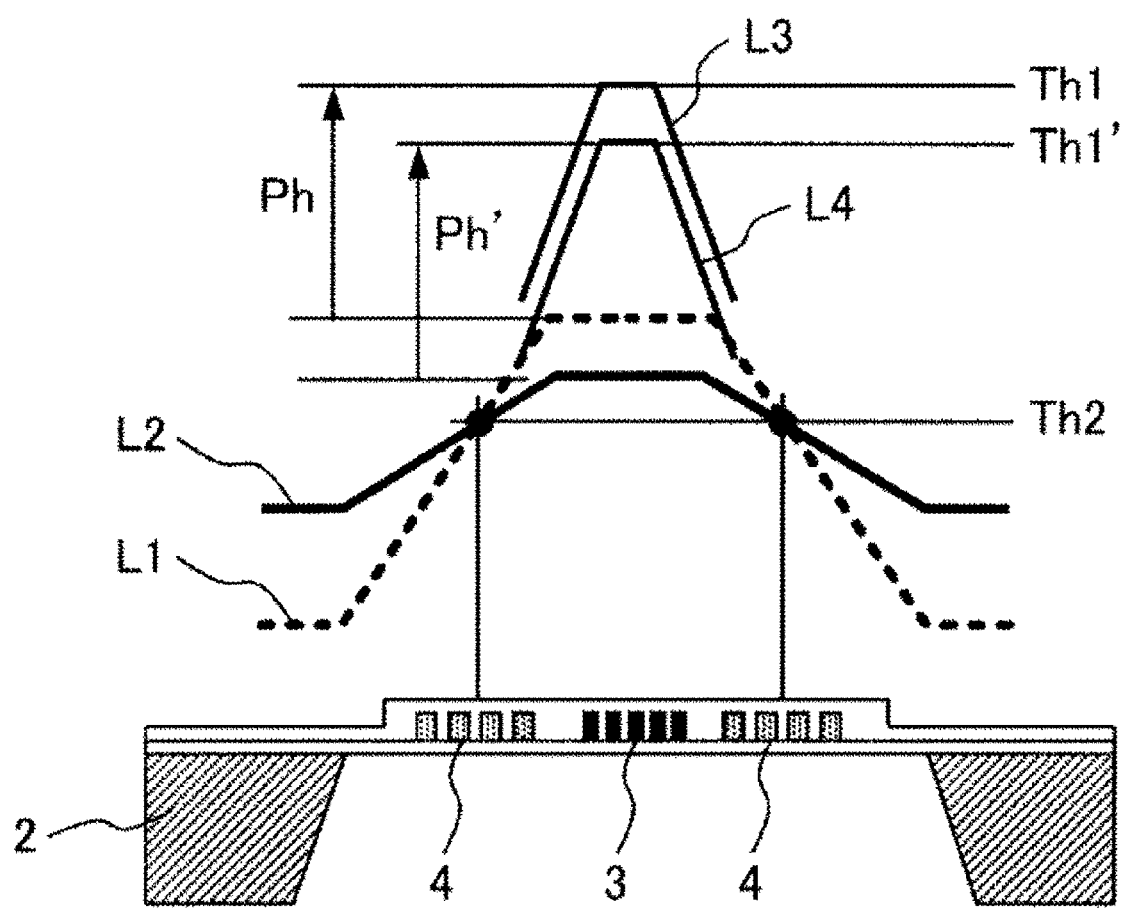
FIG. 5 is an explanatory view showing that a sensor element of the present invention is heated.

Therefore, as shown in FIG. 5, for example, when the ambient temperature (Ta) is 25° C., the state of temperature heated by the temperature compensation heater 4 rises to the heating temperature (Th1) at the time of driving, and a heat quantity as represented by the detected temperature distribution line L3 in the drawing is added, so that the heat quantity of the detection heater 3 becomes equivalent to Ph in the drawing.

On the other hand, when the ambient temperature (Ta) rises to 80° C., the temperature of the detection heater 3 changes to the heating temperature (Th1') which is lower than the heating temperature (Th1) as in the detected temperature distribution line L4. Accordingly, the heating temperature (Th1) of the detection heater 3 decreases in response to a temperature decrease of the inner region of the temperature compensation heater 4, so that the heat quantity becomes equivalent to Ph'. In this case, the heat quantity Ph≈the heat quantity Ph', so that it is possible to suppress fluctuations in heat quantity of the detection heater 3 caused by changes in ambient temperature, which allows reduction of measuring errors.

In the embodiment described above, the detection heater 3, the temperature compensation heater 4, and the wires 17, 18, 19, and 20 connected to those heaters are formed in the same layer and with the same material. Accordingly, the following effects can be obtained.

As described above, the amount of temperature changes of the detection heater 3 caused by fluctuations in ambient temperature is determined by the resistance ratio between the detection heater 3 and the wires 17, 18. In a semiconductor process, in a case where a uniform resistive film is patterned by etching to form a plurality of resistors, it is possible to enhance accuracy of a resistance ratio between those resistors.

For example, fluctuations in film thickness of the resistive film similarly fluctuate a film thickness of the resistors formed by the uniform resistive film, but a resistance balance of the plurality of resistors is maintained. Such an arrangement results in reduction of variations in the resistance balance between the detection heater 3, the temperature compensation heater 4, and the wires 17, 18, 19, and 20, and results in stabilization in the amount of temperature changes of the detection heater 3 caused by the fluctuations in the environmental temperature. Accordingly, it is possible to reduce individual differences during mass production.

This embodiment has been described with an illustration of a configuration in which the temperature of the detection heater 3 is imparted with ambient temperature dependency utilizing changes in resistor temperature of the wires 17, 18, 19, and 20. However, wired resistors formed with a single material or a plurality of materials combined also have a positive effect. In this case, it is possible to appropriately design the wired resistors by obtaining the changes in resistor temperature of the wired resistors based on resistance, temperature coefficient of resistance, and locations of the plurality of wired resistors.

In the aforementioned embodiment, as the heating temperature (Th1) of the detection heater 3 decreases in response to a rise in the ambient temperature, a difference between the heating temperature (Th1) of the detection heater 3 and the heating temperature (Th2) of the temperature compensation heater 4 reduces from $\Delta T$ to $\Delta T'$. Alternatively, it is possible to reduce the difference between the heating temperature (Th1) of the detection heater 3 and the heating temperature (Th2) of the temperature compensation heater 4 from $\Delta T$ to $\Delta T'$, as the heating temperature (Th2) of the temperature compensation heater 4 increases in response to a rise in the ambient temperature.

Figure 11:
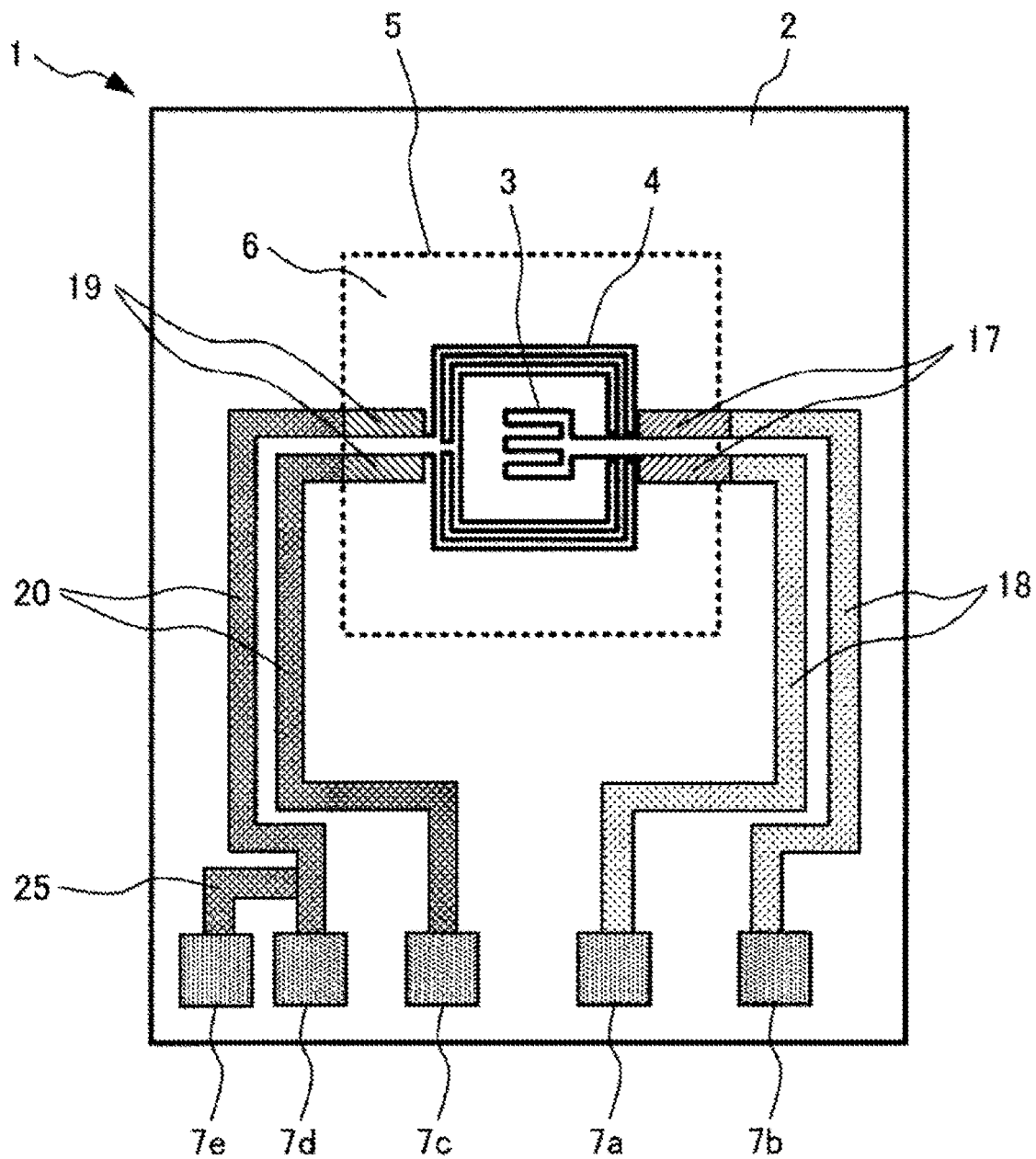
FIG. 11 is a plan view of a sensor element according to another embodiment of the present invention.

In FIG. 11, the wires 17, 18 of the detection heater 3 and the wires 19, 20 of the temperature compensation heater 4 are set to have the same resistance (the same wire length and the same wire width). In such a state, a wire 25 serving as a temperature-dependent resistor is drawn out from a part of the wire 20 of the temperature compensation heater 4, and an electrode 7e of the wire 25 is connected to the resistor 21d that forms the bridge circuit of the temperature compensation heater 4. With such an arrangement, it is possible to increase the heating temperature (Th2) of the temperature compensation heater 4 in response to a rise in the ambient temperature (Ta). In other words, the wire 25 serving as the temperature-dependent resistor is connected between the emitter electrode of the transistor 23b and the fixed resistor 21d of the temperature compensation heater 4.

Figure 12:
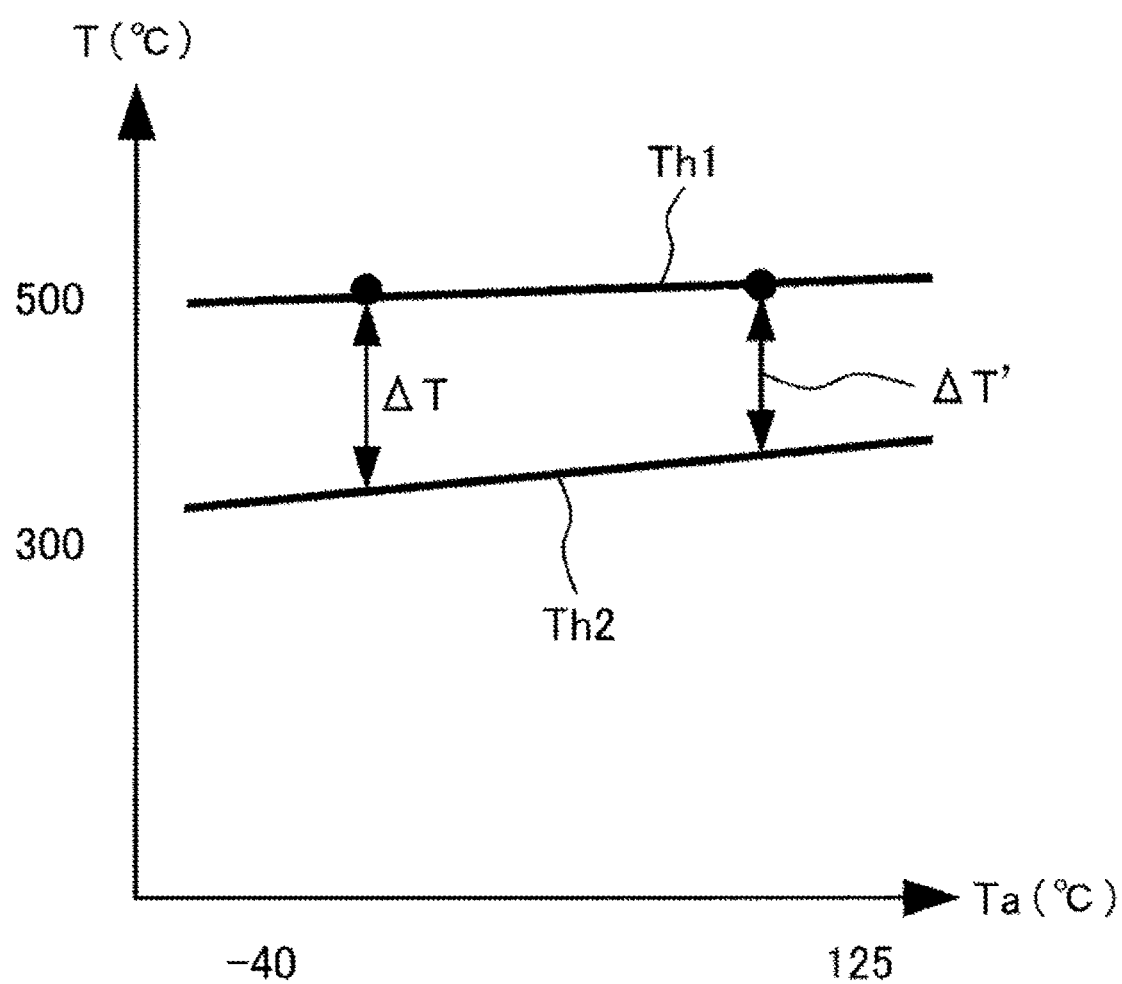
FIG. 12 is an explanatory view showing temperature dependency relative to changes in ambient temperature in the embodiment shown in FIG. 11.

FIG. 12 shows temperature dependency of the detection heater 3 and the temperature compensation heater 4 in this embodiment with respect to fluctuations in ambient temperature. The heating temperature (Th2) shown in FIG. 12 represents temperature changes of the temperature compensation heater 4. As the ambient temperature (Ta) rises, the heating currents increase, and the heating temperature (Th2) rises. Therefore, a difference between the heating temperature (Th1) of the detection heater 3 and the heating temperature (Th2) of the temperature compensation heater 4 reduces from ΔT to ΔT', so that it is possible to suppress fluctuations in heat quantity of the detection heater 3 caused by changes in ambient temperature, which reduces measuring errors.

As described above, according to a configuration of the present invention, each of a detection heater-drive circuit and a temperature compensation heater-drive circuit controls a heating current so as to reduce a temperature difference between a heating temperature of a detection heater and a heating temperature of a temperature compensation heater in response to a temperature rise of a substrate.

Accordingly, the heating temperature of the detection heater is adjusted in response to a temperature decrease in an inner region of the temperature compensation heater, so that it is possible to suppress fluctuations in heat quantity of the detection heater caused by changes in ambient temperature, which reduces measuring errors.

It should be noted that the present invention is not restricted to the aforementioned embodiments and may include various modifications. For example, the aforementioned embodiments have been described in detail to give clear descriptions to the present invention, and the present invention is not restricted to the one including the whole configurations described above. Furthermore, a configuration of one embodiment may be partially replaced by a configuration of another embodiment, and a configuration of another embodiment may be added to a configuration of one embodiment. Still further, a configuration of each embodiment may be partially added, deleted, or replaced by other configurations.

REFERENCE SIGNS LIST 1 sensor element
2 substrate
3 detection heater
4 temperature compensation heater
5 hollow portion
6 thin film support
7a to 7d electrode
8a, 8b insulating layer
9 drive circuit
10, 11 heating control circuit
12 correction computing circuit
13 output circuit
14 temperature sensor
15 pressure sensor
16 temperature-sensitive element
17, 18, 19, 20, 25 wires (temperature-dependent resistors)
21a to 21f fixed resistor
22a, 22b differential amplifier
23a, 23b transistor
24 power supply.

The invention claimed is:

1. A gas sensor device that measures a physical quantity of gas based on a thin film formed in a part of a substrate; a detection heater formed in the thin film; a temperature compensation heater formed in the thin film so as to surround the detection heater; a detection heater-heating control circuit configured to control a heating temperature of the detection heater; a temperature compensation heater-heating control circuit configured to control a heating temperature of the temperature compensation heater to be set at a heating temperature lower than the heating temperature of the detection heater; and a radiation amount of the detection heater,
wherein each of the detection heater-heating control circuit and the temperature compensation heater-heating control circuit controls a heating current so that a temperature difference between the heating temperature of the detection heater and the heating temperature of the temperature compensation heater reduces in response to a rise in temperature of the substrate.

2. The gas sensor device according to claim 1,
wherein the detection heater-heating control circuit and the temperature compensation heater-heating control circuit reduce the heating current in response to the rise in temperature of the substrate so as to decrease a temperature of the detection heater and a temperature of the temperature compensation heater, wherein the heating current is reduced in such a manner that the temperature of the detection heater drops more largely than the temperature of the temperature compensation heater.

3. The gas sensor device according to claim 2,
wherein the detection heater-heating control circuit is provided with a bridge circuit comprising: a first side to which the detection heater and a temperature-dependent resistor are connected; a second side including a fixed resistor connected to the first side in series; a third side consisting of a fixed resistor; and a fourth side consisting of a fixed resistor connected to the third side in series, and
the temperature compensation heater-heating control circuit is provided with a bridge circuit comprising: a first side to which the temperature compensation heater and a temperature-dependent resistor are connected; a second side including a fixed resistor connected to the first side in series; a third side consisting of a fixed resistor; and a fourth side consisting of a fixed resistor connected to the third side in series,
wherein the temperature-dependent resistor included in the first side of the detection heater-heating control circuit has resistance larger than resistance of the temperature-dependent resistor included in the first side of the temperature compensation heater-heating control circuit.

4. The gas sensor device according to claim 3,
wherein the detection heater and the temperature-dependent resistor included in the first side of the detection heater-heating control circuit are formed on the substrate with the same material, and
the temperature compensation heater and the temperature-dependent resistor included in the first side of the temperature compensation heater-heating control circuit are formed on the substrate with the same material as the detection heater,
wherein the temperature-dependent resistor of the detection heater-heating control circuit includes a wire having a width shorter than a width of a wire included in the temperature-dependent resistor of the temperature compensation heater-heating control circuit.

5. The gas sensor device according to claim 4,
wherein the temperature-dependent resistor and the detection heater in the detection heater-heating control circuit have a resistance ratio larger than a resistance ratio between the temperature-dependent resistor and the temperature compensation heater in the temperature compensation heater-heating control circuit.

6. The gas sensor device according to claim 5,
wherein the temperature-dependent resistor of the detection heater-heating control circuit consists of a wire formed in the thin film; and a wire formed in a member other than the thin film,
the temperature-dependent resistor of the temperature compensation heater-heating control circuit consists of a wire formed in the thin film; and a wire formed in a member other than the thin film, and
the gas sensor device has a relationship expressed by (r1+r2)/(Rh)>(r3+r4)/(Rs), where r1 represents resistance of the wire of the former control circuit formed in the thin film, r2 represents resistance of the wire of the former control circuit formed in the member other than the thin film and extending to an electrode, r3 represents resistance of the wire of the latter control circuit formed of the thin film, r4 represents resistance of the wire of the latter control circuit formed in the member other than the thin film and extending to an electrode, Rh represents resistance of the detection heater, and Rs represents resistance of the temperature compensation heater.

7. The gas sensor device according to claim 1,
wherein the gas sensor device is disposed in an intake passage of an internal combustion engine and measures humidity of intake air.

8. A method of controlling a heating current of a gas sensor device that measures a physical quantity of gas based on a thin film formed in a part of a substrate; a detection heater formed in the thin film; a temperature compensation heater formed in the thin film so as to surround the detection heater; a detection heater-heating control circuit configured to control a heating temperature of the detection heater; a temperature compensation heater-heating control circuit configured to control a heating temperature of the temperature compensation heater to be set at a heating temperature lower than the heating temperature of the detection heater; and a radiation amount of the detection heater,
wherein each of the detection heater-heating control circuit and the temperature compensation heater-heating control circuit controls a heating current so that a temperature difference between the heating temperature of the detection heater and the heating temperature of the temperature compensation heater reduces in response to a rise in temperature of the substrate.

9. The method of controlling a heating current of a gas sensor device according to claim 8,
wherein the detection heater-heating control circuit and the temperature compensation heater-heating control circuit reduce the heating current in response to the rise in temperature of the substrate so as to decrease a temperature of the detection heater and a temperature of the temperature compensation heater, wherein the heating current is reduced in such a manner that the temperature of the detection heater drops more largely than the temperature of the temperature compensation heater.

* * * * *